United States Patent [19]

Mori

[11] Patent Number: 4,868,753

[45] Date of Patent: Sep. 19, 1989

[54] SHIFT SHOCK ALLEVIATING SYSTEM FOR AUTOMATIC TRANSMISSION

[75] Inventor: Yasushi Mori, Yokohama, Japan

[73] Assignee: Nissan Motor Company, Limited, Yokohama, Japan

[21] Appl. No.: 105,786

[22] Filed: Oct. 8, 1987

[30] Foreign Application Priority Data

Oct. 8, 1986 [JP] Japan .................................. 61-237844

[51] Int. Cl.$^4$ ......................... G06F 15/50; G06G 7/70
[52] U.S. Cl. .................................... 364/424.1; 74/866
[58] Field of Search ............... 364/424.1; 74/866, 867, 74/868, 869; 192/0.031, 0.03 R, 0.034, 0.077, 3.31

[56] References Cited

U.S. PATENT DOCUMENTS 4,502,354 3/1985 Suzuki et al. ..................... 74/866
4,724,723 2/1988 Lockhart et al. .................. 74/858 X

FOREIGN PATENT DOCUMENTS 57-47056 3/1982 Japan .

OTHER PUBLICATIONS

Maintenance Manual For Automatic Transaxles of RN4F021-Type & RL4F02A-Type (A261C06), 1984.

*Primary Examiner*—Eugene R. Laroche
*Assistant Examiner*—Nathan W. McCutcheon
*Attorney, Agent, or Firm*—Foley & Lardner, Schwartz, Jeffery, Schwaab, Mack, Blumenthal & Evans

[57] ABSTRACT

A rate of the proceeding of a shifting operation during an inertia phase is adjusted to a target value such that a transmission output torque varies without any rapid change during the inertia phase and agrees smoothly with an output torque value to be established after the gear shift at the ending of the inertia phase.

4 Claims, 13 Drawing Sheets

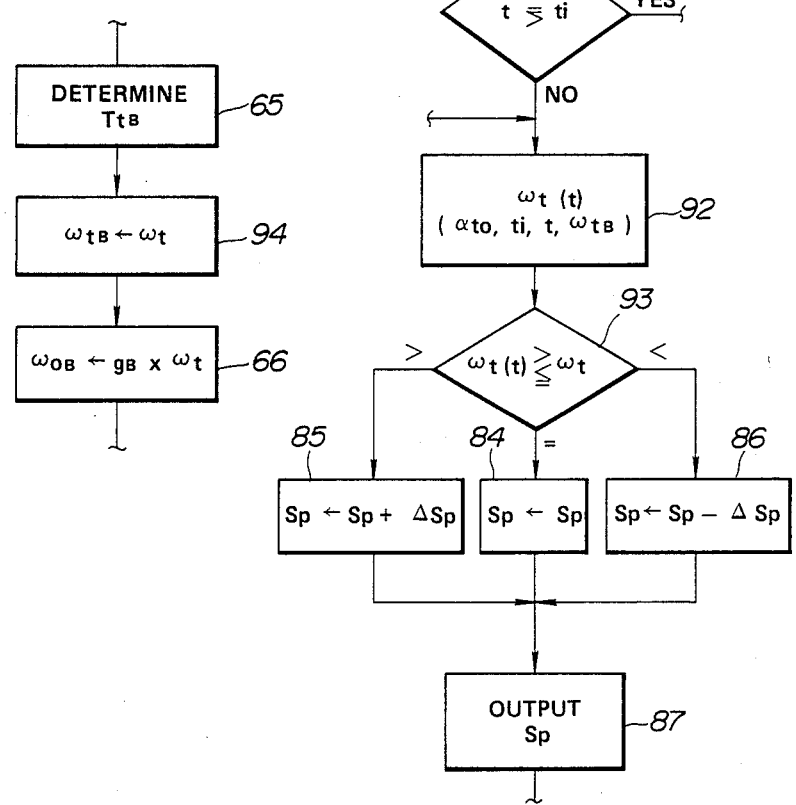

SHIFT SHOCK ALLEVIATING SYSTEM FOR AUTOMATIC TRANSMISSION

RELATED APPLICATIONS

U.S. patent application Ser. No. 071,387 filed on July 9, 1987.

U.S. patent application Ser. No. 07/089,860 filed Aug. 27, 1987 by Yasushi NARITA.

BACKGROUND OF THE INVENTION

The present invention relates to a shift shock alleviating system for an automatic transmission, and more particularly to an electro-hydraulic control system for controlling a change of gears of a multi-ratio automatic transmission.

U.S. Pat. No. 4,502,354 issued to Suzuki et al, discloses a hydraulic pressure control system for an automatic transmission. In this known control system, a servo actuating hydraulic pressure (line pressure) is temporally reduced during a change of gears so that a pressure applied via a gear shift valve to a servo for a shifting frictional element increases gradually during the change of gears. This measure is found to be effective in reducing a shift shock during the change of gears, but it is not effective at all in reducing a shock occurring due to a change in a transmission output torque at the ending of an inertia phase of the change of gears. Another problem with this measure is that the rate of increase and the timing of increase of hydraulic fluid supplied to the shifting frictional element do not meet actual demands at the beginning of the inertia phase. This results in production of a shock at the beginning of the inertia phase.

SUMMARY OF THE INVENTION

According to the present invention, a rate of proceeding of the shifting operation during an inertia phase is adjusted to a target value such that a transmission output torque varies without any rapid change during the inertia phase and agrees smoothly with an output torque value to be established after the gear shift at the ending of the inertia phase.

According to one embodiment of the present invention, an input torque (a turbine torque of a torque converter) to a transmission input shaft, an output torque of a transmission output shaft, and a revolution speed of the transmission output shaft are detected by appropriate sensors, respectively. The outputs of these sensors are supplied to a control unit. The control unit is responsive to a command for a gear shift and stores an input torque value ($T_{t0}$) detected, and a change between a gear ratio before the gear shift ($g_B$) and a new gear ratio after the gear shift ($g_A$) are used to determine a target initial torque projection value ($T_{OI0}$) of an inertia phase of the gear shift, and produces an output for producing a transmission output torque involving a torque projection that is as high as the target initial torque projection value. In response to this output of the control unit, an electro-hydraulic transducer regulates a hydraulic fluid pressure applied to activate a shifting frictional element that is to be activated during the gear shift. After the occurrence of the gear shift command, a torque phase takes place before the above-mentioned inertia phase. During the inertia phase, the control unit determines a target transient torque projection value. The target transient torque projection value is determined such that it gradually decreases with respect to time during the inertia phase from the above-mentioned target initial torque projection value to substantially zero. The control unit produces an output signal for producing a transmission output torque involving a torque projection as high as the target transient torque projection value. Thus, the electro-hydraulic transducer regulates hydraulic fluid pressure applied to activate the frictional element in response to this output during the inertia phase so that the transmission output torque during the inertia phase comes into agreement with an actual transmission output torque to be established at the new gear ratio state after the completion of the gear shift smoothly, without any step-like change.

As mentioned above, the initial torque projection value ($T_{OI0}$) is determined based on the input torque value ($T_{t0}$) detected upon occurrence of the gear shift command. If, during a period from the occurrence of the gear shift command to the beginning of the inertia phase, an actual input torque varies from the input torque value detected upon the occurrence of the gear shift command, it is desired to replace or correct the initial torque projection value based on an input torque detected immediately after the beginning of the inertia phase. Alternatively, for increased smoothness of control, the initial torque projection value may be replaced with a new value on a real time basis using an input torque detected during the period from the occurrence of the gear shift command to the beginning of the inertia phase.

In the embodiment mentioned above, a hydraulic fluid pressure applied to a shifting friction element is regulated to vary an actual transmission torque such that the torque projection rises at the beginning of an inertia phase, gradually decreases and becomes zero at the ending of the inertia phase. As is well known, a rate of change, with respect to time, of an input revolution speed ($\alpha_t$, alpha t) is variable in proportion to the torque projection torque ($T_{OI}$) so that it is possible to produce an output projection torque by regulating a hydraulic fluid pressure applied to a shifting frictional element in such a manner as to bring an actual rate of change of an input revolution speed into agreement with a target rate of change. Alternatively, an input revolution speed ($\omega_t$, omega t) that results from integration of the rate of change of input revolution speed may be used as a target value of a ratio of an input revolution speed to an output revolution speed $\lambda$ (lamda, $\lambda = \omega_t/\omega_O$) may be used as a target value.

As will now be understood from the above, the rate of proceeding of the shifting operation may represented by an output torque or a rate of change, with respect to time, of an input revolution speed or an input revolution speed or a ratio of an input revolution speed to an output revolution speed.

BRIEF DESCRIPTION OF THE DRAWINGS

FIG. 14 shows one of two portions of a flow chart of a modification of the program shown in FIGS. 11 and 12;

FIG. 15 shows the other of the two portions of the above-mentioned modification;

DETAILED DESCRIPTION OF THE INVENTION

Figure 1:
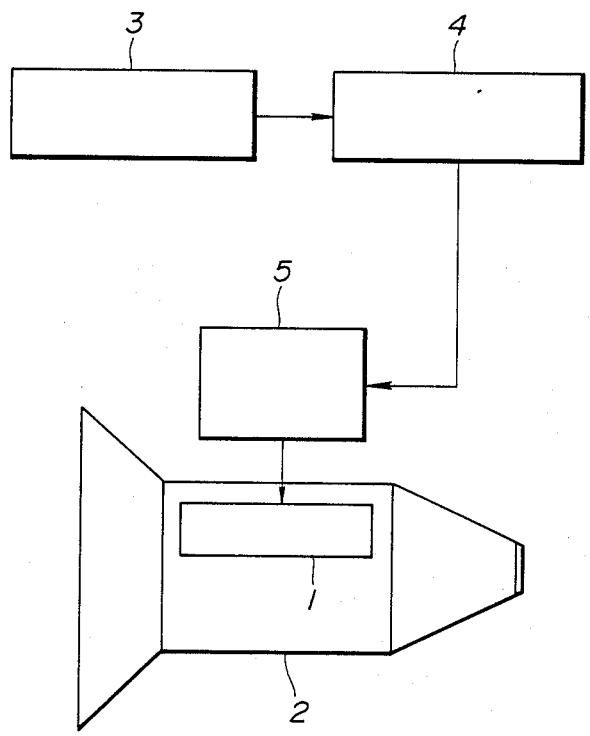
FIG. 1 is a block diagram used to explain a concept of the present invention.

Referring to FIG. 1, the reference numeral 1 generally designate a group of frictional elements, such as clutches or brakes, which are selectively activated or deactivated to establish a plurality of speed ratios or gear positions within a multi-ratio automatic transmission 2. When a command for a gear shift is issued, a period of an inertia phase is determined by calculation based on a transmission output revolution speed and a transmission output torque which are detected or determined by arithmetic operation before the inertia phase begins. This function block is designated by the reference numeral 3. A pattern of the proceeding of the shifting operation which causes the transmission to shift smoothly during the inertia phase is determined based on the inertia phase period determined at the function block 3. In accordance with this pattern, a target value is given as a function of time during the period of the inertia phase. In order to bring an actual value into agreement with the target value, a hydraulic fluid pressure applied to a shifting friction element is regulated to activate the shifting friction element in such a manner as to cause the transmission to shift smoothly. This function is performed at an electro-hydraulic transducer designated by the reference numeral 5.

Figure 2:
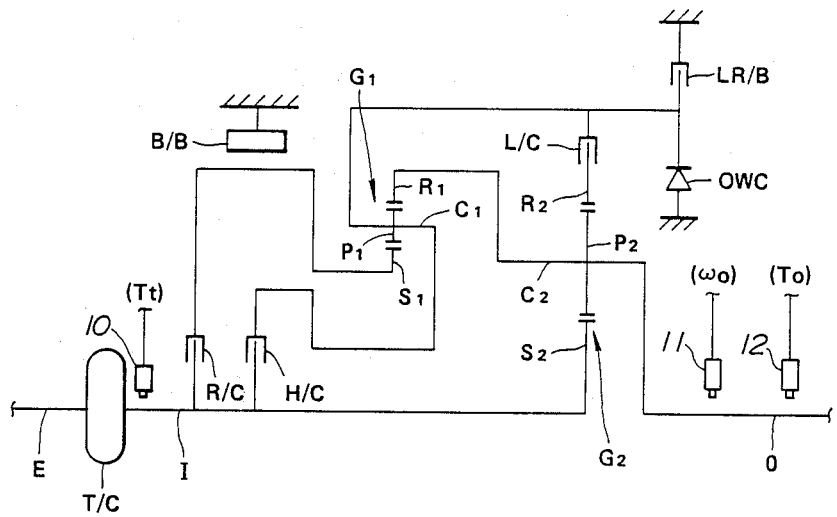
FIG. 2 is a schematic view of a power transmitting mechanism of a multi-ratio automatic transmission with various sensors.

Referring now to FIG. 2, a power transmitting mechanism of the automatic transmission 2 is described. This power transmitting mechanism of power train is well known and described in a publication "MAINTENANCE MANUAL FOR AUTOMATIC TRANSAXLES OF RN4F02A-TYPE & RL4F02A-TYPE" (A261C06). Briefly, the power train comprises a transmission input shaft I receiving a turbine torque $T_t$ from a turbine runner, not identified, of a torque converter T/C which has a pump impeller, not identified, connected for rotation with an engine output shaft E of an internal combustion engine, not shown. The power train also comprises an output shaft O, and two simple planetary gear sets $G_1$ and $G_2$ arranged between the input and output shafts I and O coaxially therewith. The first planetary gear set $G_1$ includes a sun gear $S_1$ connectable via a reverse clutch R/C to the transmission input shaft I, a ring gear $R_1$, planetary pinions $P_1$ meshing both with the sun and ring gears $S_1$ and $R_1$, and a carrier $C_1$ rotatably supporting the planetary pinions $P_1$. The carrier $C_1$ is connectable via a high clutch H/C to the transmission input shaft I. The second planetary gear set $G_2$ includes a sun gear $S_2$ connected to the transmission input shaft I, a ring gear $R_2$, planetary pinions $P_2$ meshing both with the sun and ring gears $S_2$ and $R_2$, and a carrier $C_2$ rotatably supporting the planetary pinions $P_2$. The carrier $C_2$ is connected to the ring gear $R_1$ and also to the transmission output shaft O. The carrier $C_1$ is connectable via a low clutch L/C to the ring gear $R_2$. A band brake B/B is provided to hold the sun gear $S_1$ stationary. One-way clutch OWC is operatively disposed between the carrier $C_1$ and a stationary portion of the transmission and thus the second ring gear $R_2$ is connected to the one-way clutch OWC when the low clutch L/C is engaged. A low & reverse brake LR/B is operatively disposed between the carrier $C_1$ and a stationary portion of the transmission and thus the second ring gear $R_2$ is connected to the low & reverse brake LR/B when the low clutch L/C is engaged.

The above-mentioned frictional elements are hydraulically actuated or deactuated in a predetermined schedule as shown in a TABLE on page 51 of the above-mentioned publication to provide a desired speed ratio or gear position. In the following TABLE, a schedule of engagement/release of the frictional elements is shown.

TABLE

|   | L/C | B/B | H/C | OWC | R/C | LR/B |
|---|---|---|---|---|---|---|
| 1 | o |   |   | o |   | (o) |
| 2 | o | o |   |   |   |   |
| 3 | o |   | o |   |   |   |
| 4 |   | o | o |   |   |   |
| R |   |   |   |   | o | o |

In the above TABLE, the sign "o" represents that a particular frictional element is engaged, and thus no sign means that the particular frictional element is released. The sign "(o)" means that a particular frictional element is engaged during engine brake running.

According to the present invention, there are provided the following sensors. They include an input torque sensor 10 which detects a turbine torque $T_t$ on the turbine runner of the torque converter T/C, to which turbine torque is applied, as an input torque, to the transmission input shaft I, an output shaft revolution speed sensor 11, and an output torque sensor 12. The output shaft revolution speed sensor 11 detects a revolution speed $\omega_O$ (omega O) of the output shaft O and the output torque sensor 12 detects an output torque $T_O$ on the output shaft O.

Figure 3:
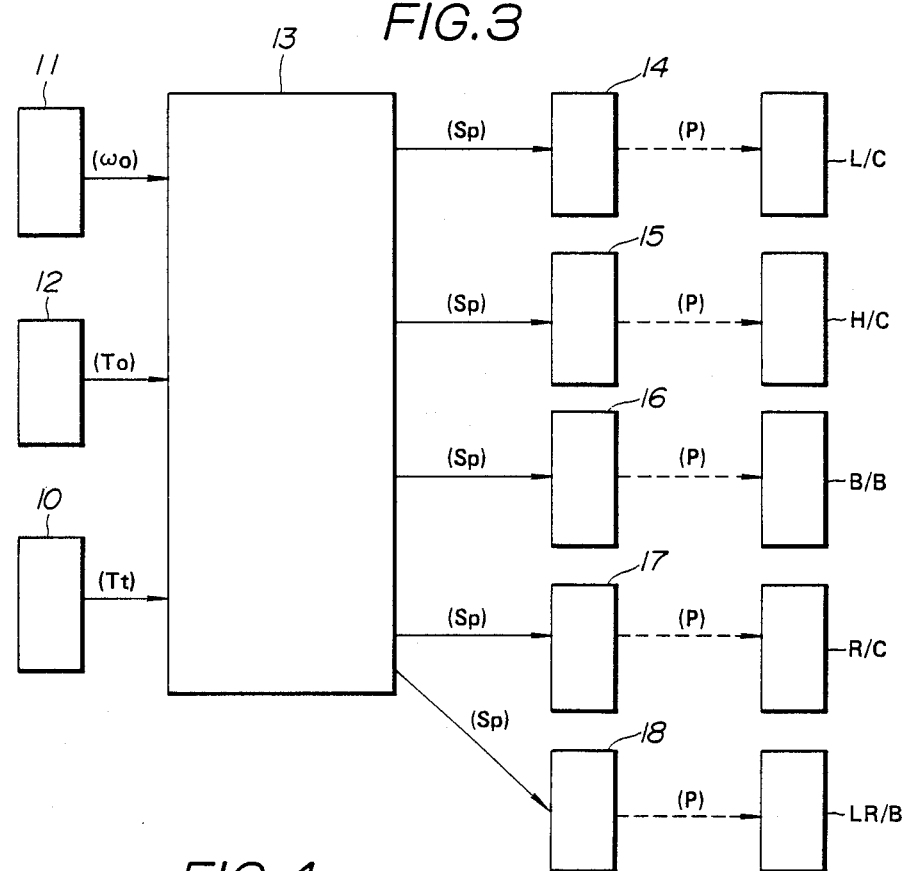
FIG. 3 is a block diagram of a control unit associated with the various sensors, and with electro-hydraulic transducers fluidly connected to frictional elements of the power transmitting elements, such as clutches or brakes.

As shown in FIG. 3, the output signals of these sensors 10, 11, and 12 are supplied to a control unit 13, i.e., a microcomputer based control unit including as usual a CPU, a ROM, a RAM, an input controller, and an output controller. In FIG. 3, the reference numerals 14, 15, 16, 17, and 18 designate electro-hydraulic transducers, respectively. The electro-hydraulic transducer 14 regulates a hydraulic fluid pressure P applied to the frictional element L/C in response to an output signal of the control unit 13 when the frictional element L/C is to be actuated. Similarly, the electro-hydraulic transducers 15, 16, 17, and 18 regulate hydraulic fluid pressures applied to the frictional elements H/C, B/B, R/C, and LR/B, respectively.

Figure 4:
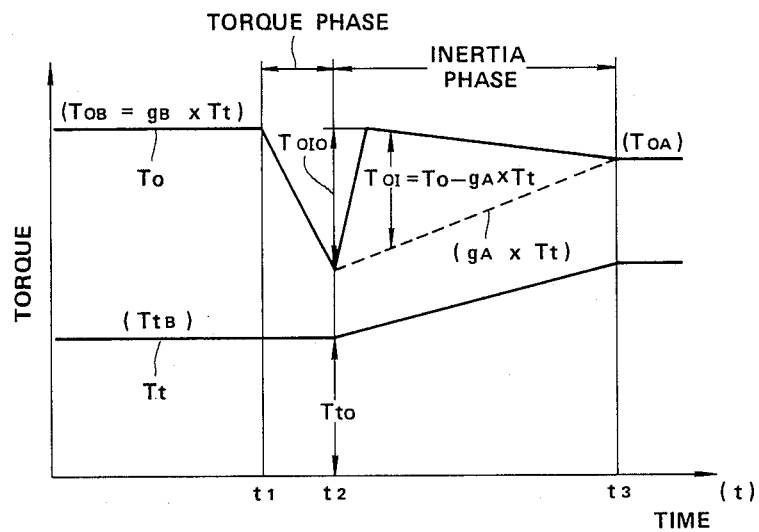
FIG. 4 is a timing chart diagrammatically illustrating an ideal pattern of variation of a transmission output torque ($T_O$) during a torque phase ($t_1$–$t_2$) of a gear shift and the subsequent inertia phase ($t_2$–$t_3$) and the variation of a transmission input torque ($T_i$) during the gear shift.

Referring to FIG. 4, the principles of alleviating a shift shock is explained. In FIG. 4, $T_t$ generally represents an input torque to the transmission input shaft I, and $T_O$ generally represents an output torque from the transmission output shaft O. The fully drawn line indicated by $T_t$ and the fully drawn line indicated by $T_O$ show ideal behaviors of the input torque and the output torque during engagement of a frictional element upon a shift-up operation. Assuming that a gear ratio established before the shift is $g_B$, and a transient gear ratio during the shift is $g_A$, an output torque before the shift $T_{OB}$ is expressed by the equation $T_{OB} = g_B \times T_{tB}$ ($T_{tB}$: an input torque before the shift). As is well known, a period of the shift is divided into a torque phase (from $t_1$ to $t_2$) and an inertia phase (from $t_2$ to $t_3$). During the torque phase ($t_1$-$t_2$), the input torque is substantially unchanged, while the output torque declines, and during the subsequent inertia phase ($t_2$-$t_3$), the input torque $T_t$ increases gradually to an input torque value to be established after the gear shift, while the output torque rises sharply initially and gradually declines to a level as high as an output torque value $T_{OA}$ to be established after the shift. The output torque during the inertia phase is considered to be a sum of a gear ratio related term expressed by $g_A \times T_t$ and a torque projected term expressed by $T_{OI}$, i.e., a torque projection. The variation of the gear ratio related term is illustrated by a broken line in FIG. 4. The output torque $T_O$ during the inertia phase ($t_2$-$t_3$) therefore is expressed as: $T_O = g_A \times T_t + T_{OI}$. It has been confirmed that a desired shockless shift is accomplished by gradually decreasing the torque projecting after allowing an initial rise at the initiation of the inertia phase and bringing it into agreement with the output torque value $T_{OA}$ at the ending of the inertia phase as illustrated in FIG. 4.

This variation of the output torque is expressed as follows: If the initial rise of the torque projection is expressed by $T_{OI0}$ and an input torque at the occurrence of the initial rise is expressed by $T_{t0}$, the initial rise of the torque projection is expressed as, $$T_{OI0} = (g_b - g_A) T_{TO} \quad (1).$$

Thus, the torque projection $T_{OI}$ should be decreased at a rate as expressed by the following equation.

$$T_{OI} = \left(1 - \frac{t}{t_i}\right) T_{OI0} \quad (2)$$

where, $t_i$: a period of the inertia phase.

The period of the inertia phase $t_i$ is determined as follows.

The amount of energy during the inertia phase E (i.e., an inertia phase energy amount) is expressed as, $$E = T_{OI} dt$$
$$= K(g_A g_B) \omega_O \quad (3),$$

where, K: a predetermined constant determined for each gear shift.

As will be understood from the illustration in FIG. 4, the inertia phase energy amount E is regarded as an area of a triangle with two orthogonal line segments having lengths $T_{OI0}$ and $t_i$, respectively. Thus, the inertia phase energy amount is expressed also as, $$E = \frac{1}{2} \times T_{OI0} \times t_i$$

Therefore, $$t_i = \frac{2E}{T_{OI0}}. \quad (4)$$

From the equations (3) and (4), the inertia phase period $t_i$ is expressed as, $$t_i = \frac{2K(g_A - g_B)\omega_O}{T_{OI0}}$$

Substituting equation (1), $$= -\frac{2K \cdot \omega_O}{T_{t0}}. \quad (5)$$

The principle discussed above is put into practice by the microcomputer based control unit shown in FIG. 3 which stores in its ROM control programs as will be described hereinafter referring to FIGS. 5 and 6. The program shown in FIG. 5 is executed on occurrence of a command for a gear shift, and then the program shown in FIG. 6 is executed after expiration of a predetermined time $\Delta t$ (delta t).

Figure 5:
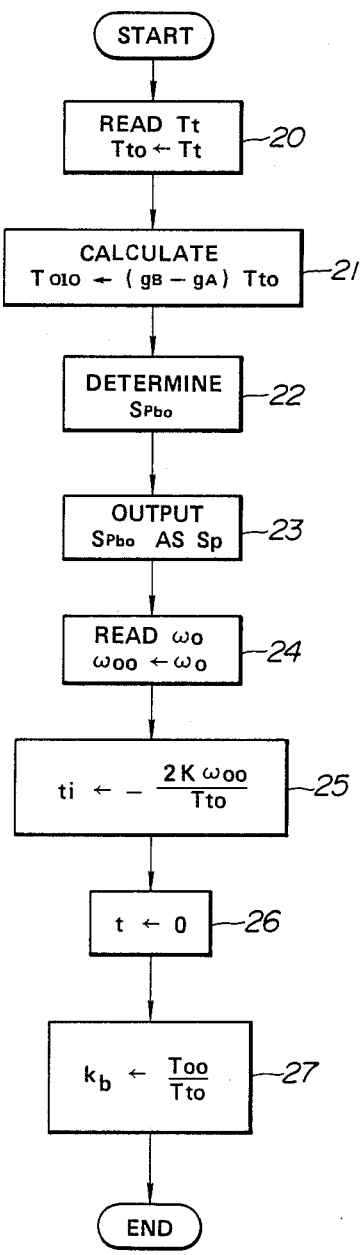
FIG. 5 is a flow chart of a program which is executed once by the control unit immediately after or upon receiving a command for a gear shift.

Referring to FIG. 5, in a step 20, an input torque $T_t$ is read at the instance $t_1$ when the gear shift command occurs and is stored as an input torque $T_{t0}$ at the beginning of an inertia phase. In the subsequent step 21, the above-mentioned initial rise of the torque projection $T_{OI0}$ is determined by calculating the equation (1) using the content of $T_{t0}$ and using gear ratios before and after the gear shift, which ae stored, versus the kinds of gear shifts in the ROM, such as $g_B$ and $g_A$. In a step 22, a table look-up operation or a calculation is performed to determine the quantity of electricity $S_{Pb0}$ corresponding to the magnitude of hydraulic fluid applied to the shifting frictional element for causing production of torque projection as much as the target torque projection $T_{OI0}$ that has been determined in the step 21. Then, in a step 23, $S_{Pb0}$ is outputted as an output signal $S_P$ to one of the electro-hydraulic transducers 14–18 for the shifting friction element. In the subsequent step 24, an output revolution speed $\omega_O$ (omega O) is read and stored as an output revolution speed $\omega_{O0}$ (omega O zero). Then, in a step 25, a calculation of equation (5) is made to determine an inertia phase period $t_i$. After this estimating step of the inertia phase period $t_i$, a timer t is reset to 0 (zero). This timer t is used in the program shown in FIG. 6 to measure time elapsed after the instant $t_2$ when the inertia phase begins. Subsequently, an output shaft torque $T_O$ is read and stored as an output torque $T_{O0}$ at the beginning of the inertia phase. In the last step 27, an input/output torque ratio $k_B$ is determined by calculating $T_{O0}/T_{t0}$. The content $k_b$ is approximately equal to $g_B$ (a gear ratio before a gear shift).

Figure 6:
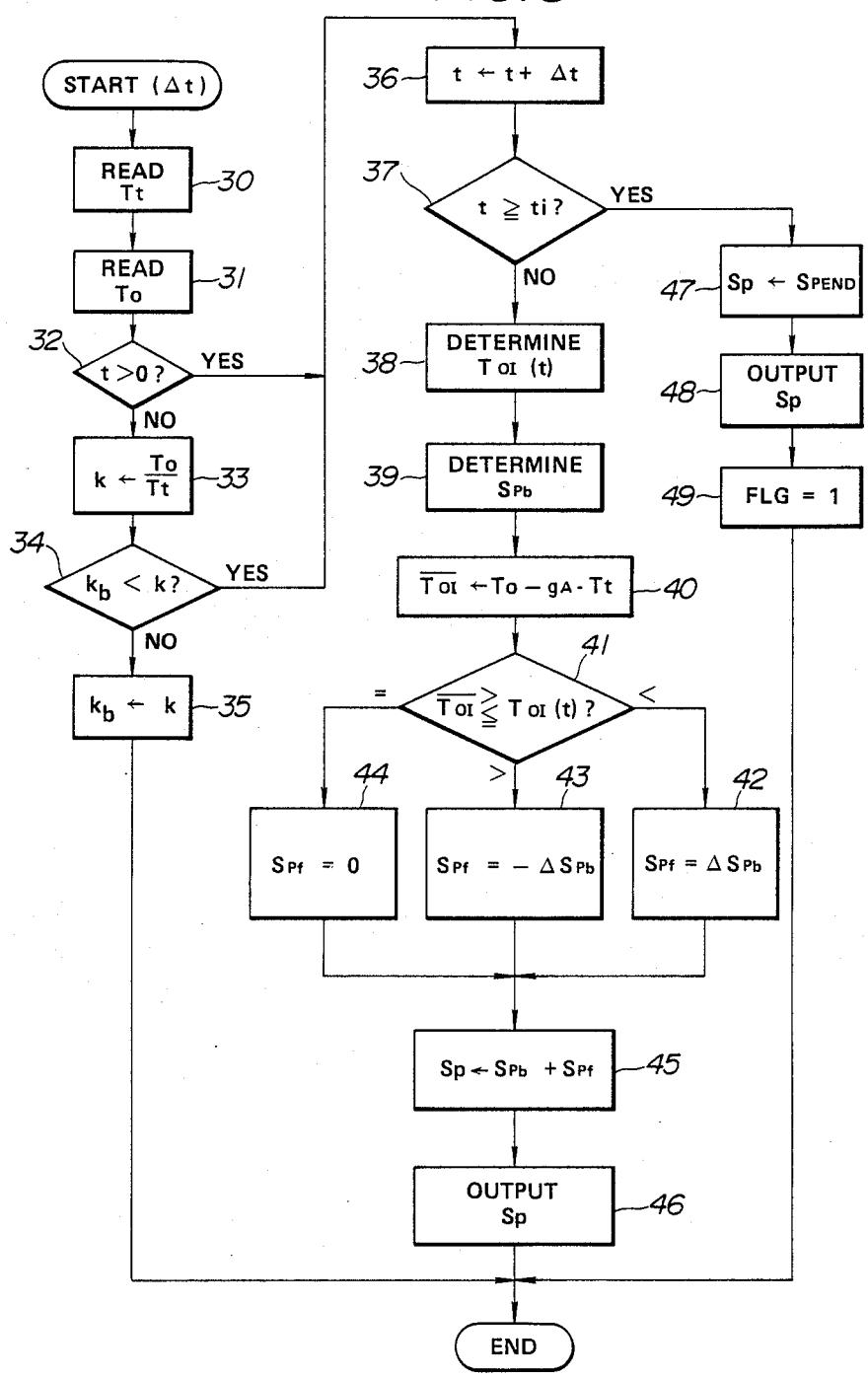
FIG. 6 is a flow chart of a program which is executed upon expiration of a predetermined time ($\Delta t$) after the end of the program shown in FIG. 5.

After executing the routine shown in FIG. 5, the control unit performs the execution of the program shown in FIG. 6 after expiration of the predetermined time t (delta t). Referring to FIG. 6, in steps 30 and 31, an input torque $T_t$ and an output torque $T_O$ are read. In a step 32, a decision is made whether the timer t has counted up or not to determine whether the inertia phase has begun or not. If the inertia phase has not begun, the program proceeds to a step 33 where an input/output torque ratio k is determined by calculating $T_O/T_t$. In the subsequent step 34, a judgement is made whether the inertia phase has begun or not by making a decision whether the current input/output torque ratio k has exceeded the content of $k_b$. Initially the content of $k_b$ is determined by the calculation in the step 27 (see FIG. 5). If the inertia phase has not yet begun, the program proceeds to a step 35 where the content of $k_b$ is updated by the content of k.

In the subsequent run, if it is judged in the step 34 that the inertia phase has begun, the program proceeds from the step 34 to a step 36 where an increment of the content of the timer t is made by the predetermined cycle time $\Delta t$ (delta t). Thus, after this run, the program proceeds from the step 32 to the step 36. After the step 36, a step 37 is executed where a judgement is made whether the inertia phase which already begun has ended or not by deciding whether the content of the timer t is equal to or greater than the inertia phase period $t_i$ or not.

During the inertia phase, the program always proceeds from the step 37 to a step 38 where the equation (2) is calculated using the results obtained in the steps 21, 25, and 36 to determine a target torque projection $T_{OI}(t)$ that is variable with respect to time. In a step 39, a table look-up operation or calculation is performed to determine the quantity of electricity $S_{Pb}$ corresponding to the amount of hydraulic fluid pressure applied to the shifting friction element for causing the production of the torque projection as much as the content $T_{OI}(t)$. In the subsequent step 40, an actual torque projection $\overline{T_{OI}}$ is determined by calculating the equation $T_O - g_A T_t$. In a step 41, the actual torque projection $\overline{T_{OI}}$ is compared with the target torque projection $T_{OI}$. If the actual torque projection $\overline{T_{OI}}$ is less than the target torque projection $T_{OI}(t)$, an increment $S_{Pf}$ is given a positive value $S_{Pb}$ in a step 42, and then the output signal $S_P$ is increased in a step 45 to cause the actual torque projection $\overline{T_{OI}}$ to increase toward the target torque projection $T_{OI}(t)$. If the actual torque projection $\overline{T_{OI}}$ is greater than the target torque projection $T_{OI}(t)$, the increment $S_{Pf}$ is given a negative value $-S_{Pb}$ in a step 43, and then the output signal $S_P$ is decreased in the step 45. If the actual torque projection $\overline{T_{OI}}$ is equal to the target torque projection $T_{OI}(t)$, the increment $S_{Pf}$ is given a value 0 (zero) in a step 44, and thus the current state $T_{OI} = T_{OI}(t)$ is maintained. After the step 42 or 43 or 44, the program proceeds to the step 45 where the output signal $S_P$ is given as the sum of $S_{Pb}$ and $S_{Pf}$, and in the subsequent step 46, the output signal $S_P$ is outputted to the electro-hydraulic transducer for the shifting friction element.

If, in the step 37, it is judged that the inertia phase has ended, i.e., the gear shift has been completed, the program proceeds to a step 47 where the final output value $S_{PEND}$ is set as the output signal $S_P$. The final output value $S_{PEND}$ is a value which causes the hydraulic fluid pressure applied to the shifting frictional element to increase to the maximum value. The output signal $S_P$ thus given is outputted to the electro-hydraulic transducer for the shifting friction element. In this manner, baking of the shifting friction element is prevented. After the step 48, the program proceeds to a step 49 where a gear shift completion flag FLG is set equal to 1. The control arrangement is such that if the shift completion FLG is set equal to 1, the execution of the program shown in FIG. 6 will not be initiated.

As will now be appreciated from the description of the programs 5 and 6, during the inertia phase, the output torque $T_O$ varies in the ideal manner as illustrated in FIG. 4. Therefore, no rapid change in the output torque which would cause a shift shock takes place and the variation of the output torque before and after the ending of the inertia phase is smooth. As a result, an improved shockless gear shift has been accomplished.

Figure 7:
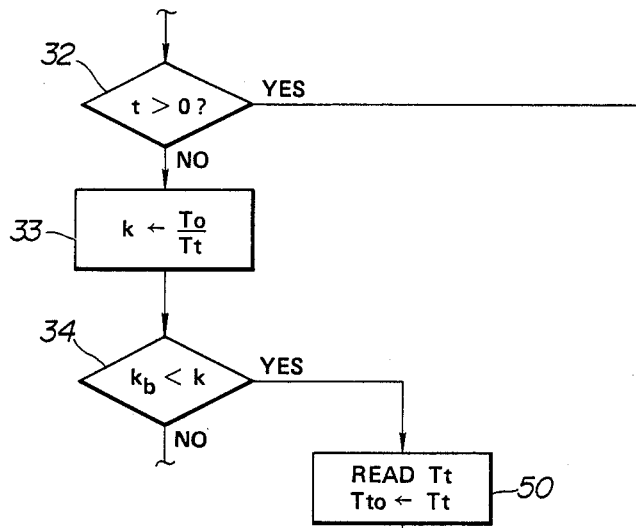
FIG. 7 shows a portion of a flow chart of a first modification of the program shown in FIG. 6.
Figure 8:
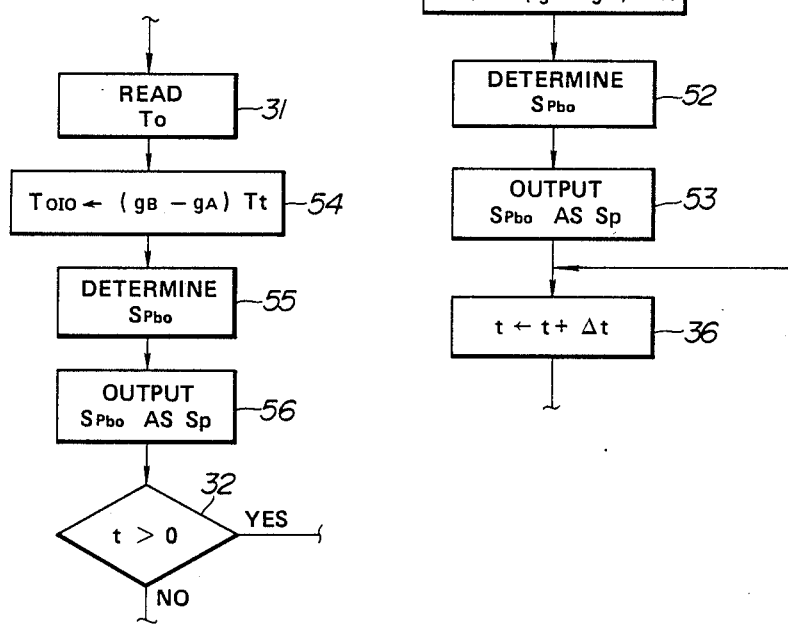
FIG. 8 shows a portion of a flow chart of an alternative and second modification of the program shown in FIG. 6.

FIGS. 7 and 8 show modifications of the program shown in FIG. 6, respectively. Referring to FIG. 7 in comparison with FIG. 6, this modification results from insertion of steps 50, 51, 52, and 53 between the steps 34 and 36. Referring also to FIG. 5, it will be noted that these steps 50, 51, 52, and 53 contain substantially the same jobs as in the steps 20, 21, 22, and 23. Thus, by repeating these jobs until the inertia phase begins, the accuracy of the control is maintained even if the input torque $T_t$ varies after the instance $t_1$ where the gear shift command occurred. If the modified program as shown in FIG. 7 is executed, $S_{Pb0}$ determined in the step 22 becomes a temporary value of the quantity of electricity and is replaced with a new value obtained in the step 52. Even though there is a difference between these values, the amount of difference is small enough to not cause any problem.

In the modification shown in FIG. 8, new steps 54, 55, and 56 are inserted between the steps 31 and 32 (see FIG. 6). With these new steps, the initial rise of the torque projection $T_{OI0}$ is kept being corrected on a real time basis till the beginning of the inertia phase, resulting in improving the control accuracy.

Although, in the previously described embodiment, the output torque $T_O$ is controlled in such a manner that the torque projection $T_{OI}$ rises in time with the beginning of the inertia phase and gradually declines finally to zero at the ending of the inertia phase, the control objective may be replaced with a rate-of-change of an input revolution speed $\alpha_t$ (alpha t) because this rate is proportional to the output torque $T_O$. Alternatively, an input revolution speed $\omega_t$ (omega t) may be used as the control objective because it results from integrating the rate-of-change of the input revolution speed $\omega_t$ (alpha t) or an input/output revolution speed ratio $\lambda$ (lambda, viz., $\lambda = \omega_t/\omega_O$, may be used as the control objective.

Figure 9:
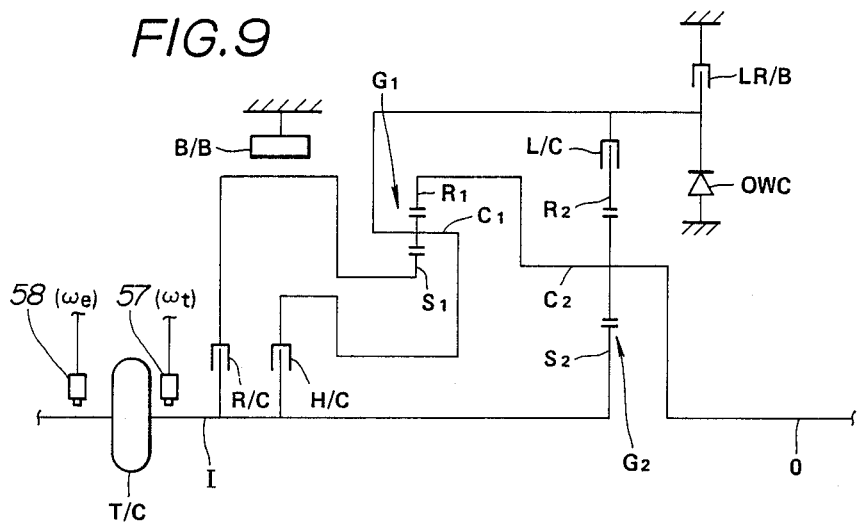
FIG. 9 is a view similar to FIG. 2 and shows a power transmitting mechanism of a multi-ratio automatic transmission with various sensors used by a second embodiment.
Figure 10:
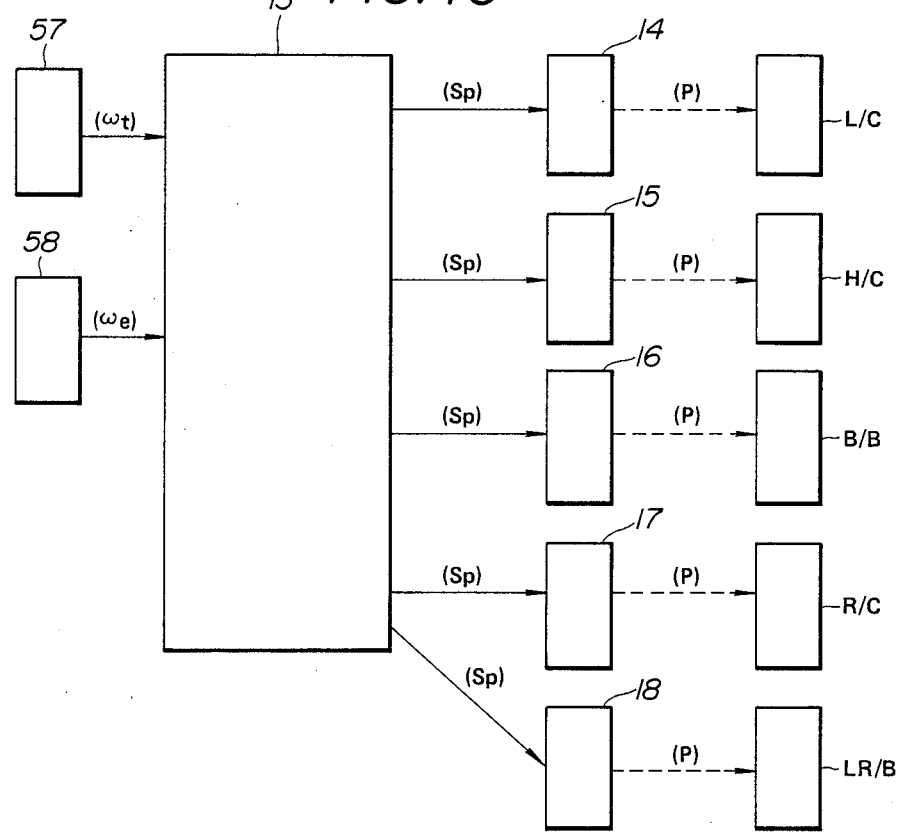
FIG. 10 is a block diagram similar to FIG. 3 and shows a control unit based by the second embodiment.
Figure 11:
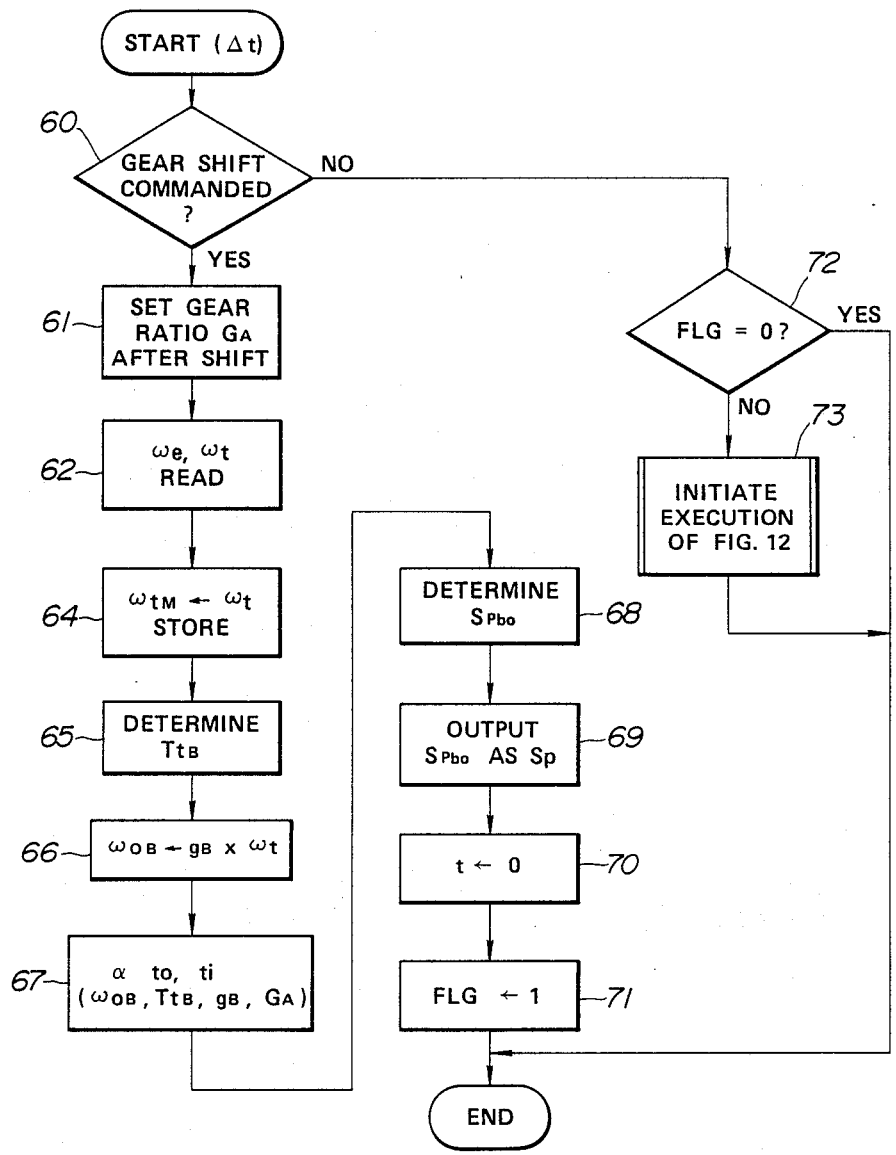
FIG. 11 is a flow chart of a program which is executed after expiration of a predetermined time ($\Delta t$)
Figure 12:
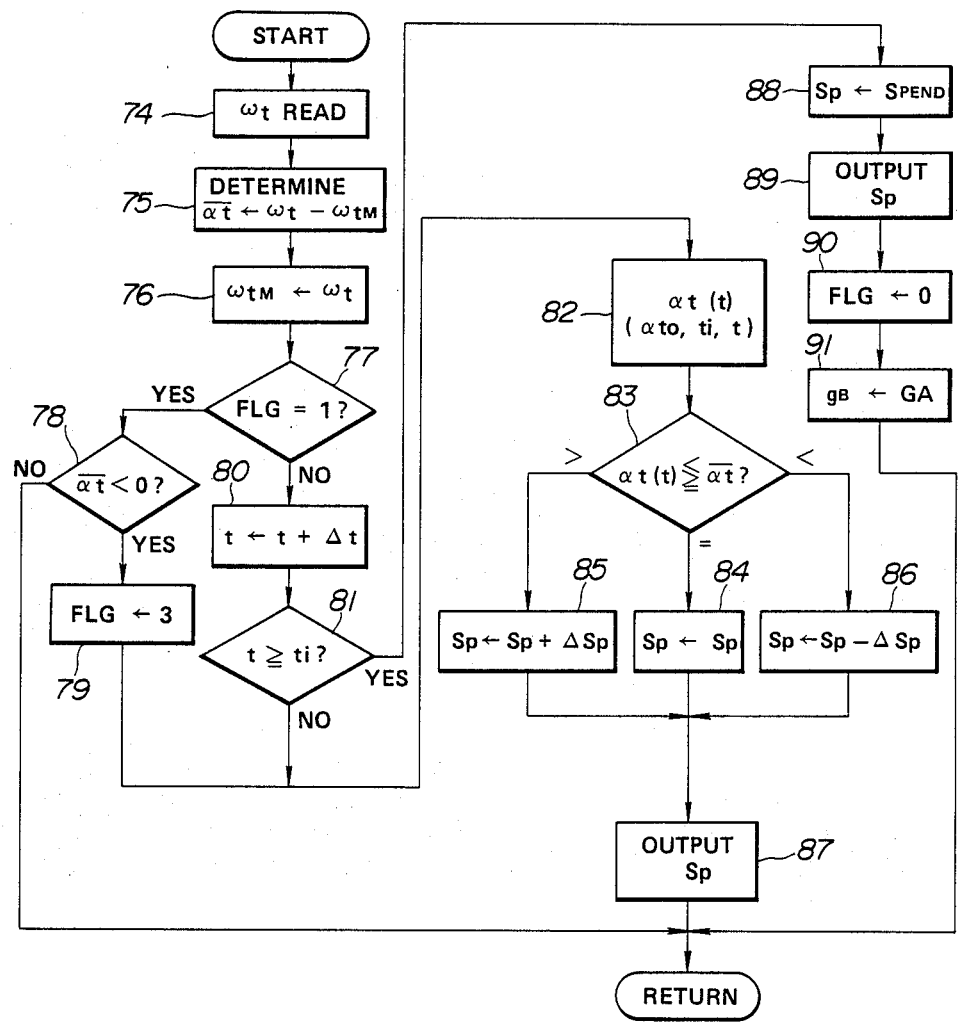
FIG. 12 is a flow chart of a gear change control routine.

Referring to FIGS. 9, 10, 11, 12, and 13, another embodiment is described. In this embodiment, as shown in FIG. 9, there are arranged an input shaft revolution speed sensor 57, and an engine revolution speed sensor 58 different from the two torque sensors 10 and 12 and the output revolution speed sensor 11 in the case of FIG. 2. As shown in FIG. 10, the output signals of the sensors 57 and 58 are supplied to a microcomputer based control unit 13 which stores in its ROM control programs as shown in FIGS. 11 and 12.

Figure 13:
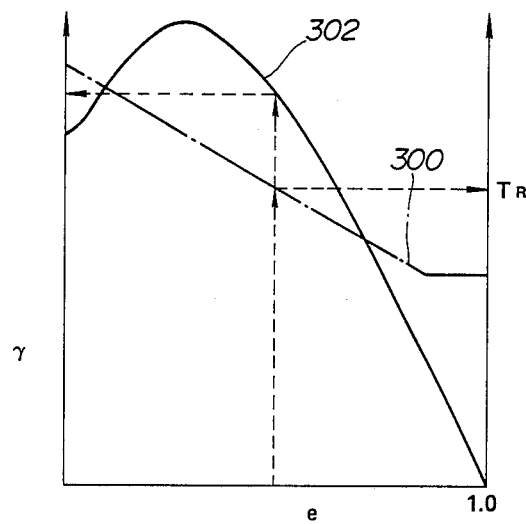
FIG. 13 shows performance of a torque converter as expressed by a characteristic curve 302 of the variation of an input torque capacity coefficient $\tau$ (tau) versus a ratio e of an engine revolution speed ($\omega_e$) to a transmission input revolution speed ($\omega_t$) and also by another characteristic curve 300 of the variation of a torque ratio $T_R$ versus the ratio e.

Referring to FIG. 11, this program is executed after expiration of a predetermined time $\Delta t$ (delta t). First, in a step 60, a decision is made whether a command for a gear shift is issued as a result of a shift control program, not shown. It is to be noted that the control proceeds to a step 61 immediately after occurrence of a gear shift command. In the step 61, a gear ratio to be established upon completion of a gear shift command is determined and stored as $G_A$. In the subsequent step 62, an engine revolution speed $\omega_e$ and an input revolution speed $\omega_t$ are read from the output signals of the engine revolution speed sensor 58 and the input revolution speed sensor 57, respectively. In a step 64, the input revolution speed $\omega_t$ obtained in the step 62 is stored as a previous value $\omega_{tM}$ of input revolution speed. In the subsequent step 65, an input torque $T_{tB}$ (see FIG. 4) before the gear shift is determined. The determination of this output torque $T_{tB}$ is made in the following manner. Using a speed ratio e, viz., $e = \omega_t/\omega_e$, table look-up operations of the stored data as illustrated by torque converter performance curves 300 and 302 in FIG. 13 are performed to determine a torque ratio $T_R$ and a torque capacitor coefficient $\tau$ (tau). Then, a well known equation, $T_{tB} = T_R \times \tau \times \omega_e^2$, is calculated. In a step 66, an output revolution speed $\omega_{OB}$ before the gear shift is given as the product of a gear ratio $g_B$ before the gear shift, i.e., this gear ratio being stored in a manner later described referring to FIG. 12, and the input revolution speed $\omega_t$ obtained in the step 62. In the subsequent step 67, a target rate-of-change $\alpha_{t0}$ (alpha t zero) of input revolution speed to be accomplished at the initial moment of the inertia phase is determined based on the gear ratios $g_B$ and $G_A$, and an inertia phase period $t_i$ is determined based on the above-mentioned rate-of-change $\alpha_{t0}$, the output revolution speed $w_{OBz}$ before the shift, and the gear ratios $g_B$ and $G_A$.

In a step 68, the quantity of electricity $S_{Pb0}$ corresponding to the magnitude of a hydraulic fluid pressure applied to a shifting frictional element for obtaining an actual input revolution speed rate-of-change as high as the target rate-of-change $\alpha_{t0}$ is determined by a table look-up operation or a calculation. In the next step 69, this quantity of electricity $S_{Pb0}$ is outputted as an output signal $S_P$ to the electro-hydraulic transducer for the shifting frictional element that is to be activated during the gear shift. Then, in a step 70, a timer t which is provided to measure elapse of time after the beginning (the instance $t_2$) of the inertia phase is reset to 0 (zero), and a flag FLG is set to 1 in a step 71 as an indication that the shift command has occurred.

In the subsequent cycle of run, the control proceeds from the step 60 to a step 72. In this step 72, a decision is made whether the flag FLG is set equal to 0 (zero) or not. Since the flag FLG was set equal to 1 in the previous cycle of run, the control proceeds to a step 73 and the execution of the control program shown in FIG. 12 is initiated.

Referring to FIG. 12, an input revolution speed $\omega_t$ (omega t) is read in a step 74. In the subsequent step 75, an actual rate-of change $\overline{\alpha_t}$ is given as the result of subtraction from the present input revolution speed $\omega_t$ the previously stored input revolution speed value $\omega_{tM}$. Next, in a step 76, the input revolution speed $\omega_t$ obtained in the step 74 is stored as the previous input revolution speed $\omega_{tM}$. In the subsequent step 77, a decision is made whether the flag FLG is set equal to 1 or not to determine whether the inertia phase has not yet begun or has already begun. If the flag FLG is set to 1, i.e., if the inertia phase has not yet begun, the control proceeds to a step 78, and a judgement is made whether the inertia phase has begun or not by making a decision whether the actual rate-of-change $\alpha_t$ is negative (in the case of an upshift) or not. If the inertia phase has not yet begun, this program ends. If, on the contrary, the inertia phase has begun, the control proceeds from the step 78 to a step 79 where the flag FLG is set equal to 3. After the flag FLG has been equal to 3, the control always proceeds from the step 77 to a step in the subsequent runs. After setting the flag FLG to 3, the control proceeds to a step 82.

In the step 80, the content of the timer t is increased by $\Delta t$ (delta t), and the content of the timer t is compared with the inertia phase period $t_i$ in a step 81 to determine whether the interia phase has ended or not. During the initial phase, a target input revolution speed rate-of-change $\alpha_t(t)$ which varies as time passes is determined by calculating the following equation, $$\alpha_t(t) = \left(1 - \frac{t}{t_i}\right) \cdot \alpha_{t0}.$$

In the next step 83, this target input revolution speed rate-of-change $\alpha_t(t)$ is compared with the actual rate-of-change $\overline{\alpha_t}$. If both of them are equal to each other, the program proceeds to a step 84, and the present output signal $S_P$ is maintained. If the actual rate-of-change $\overline{\alpha_t}$ is less than the target rate-of-change $\alpha_t(t)$, the program proceeds to a step 85 where the output signal $S_P$ is increased by a correction amount $\Delta S_P$ (delta $S_P$), causing the actual rate-of-change $\overline{\alpha_t}$ to approach the target rate-of-change $\alpha_t(t)$. If the actual rate-of-change $\overline{\alpha_t}$ is greater than the target rate-of-change $\alpha_t(t)$, the program proceeds to a step 86 where the output signal $S_P$ is decreased by the correction amount $\Delta S_P$ (delta $S_P$), causing the actual input revolution speed rate-of-change to approach the target rate-of-change $\alpha_t(t)$. After the step 84 or 85 or 86, the output signal $S_P$ is outputted to the corresponding electro-hydraulic transducer for the shifting frictional element.

If, in the subsequent run, it is judged in the step 81, the inertia phase has ended, the program proceeds to a step 88 where the output signal $S_P$ is set equal to a final output value $S_{PEND}$ and then to a step 89 where the output signal $S_P$ is outputted. Thus, the hydraulic fluid pressure applied to the shifting frictional element is allowed to assume the maximum value, preventing baking of the frictional element. In the subsequent step 90, the flag FLG is reset 0 (zero), and then in a step 91, the gear ratio $G_A$ is stored as the previous gear ratio $g_B$.

FIGS. 14 and 15 show a modification of the control programs of FIGS. 11 and 12. In this modification, as shown in FIG. 14, a new step 94 is inserted in between the steps 65 and 66 (see FIG. 11), and as shown in FIG.

15, new steps 92 and 93 are provided in place of the steps 82 and 83 of the program shown in FIG. 12. This modification is intended to change the control objective to an input revolution speed. In other words, control is made to adjust an actual input revolution speed $\omega_t$ toward a target revolution speed $\omega_r(t)$.

Referring to FIG. 14 in comparison with FIG. 11, an input revolution speed $\omega_t$ obtained in the step 62 (see FIG. 11) is stored as an input revolution speed $\omega_{tB}$ at the initial period of the inertia phase. Referring to FIG. 15, in the step 92, a target input revolution speed $\omega_r(t)$ is determined based on $\omega_{tB}$ (omega tB), $\alpha_{t0}$ (alpha t0), $t_i$, and t. In the subsequent step 93, the target input revolution speed $\omega_r(t)$ is compared with the actual input revolution speed $\omega_t$ obtained in the step 62. Then the program proceeds to a step 84 if $\omega_r(t)=\omega_t$, to a step 85 if $\omega_r(t)$ is greater than $\omega_t$, and to a step 86 if $\omega_r(t)$ is less than $\omega_t$.

Figure 16:
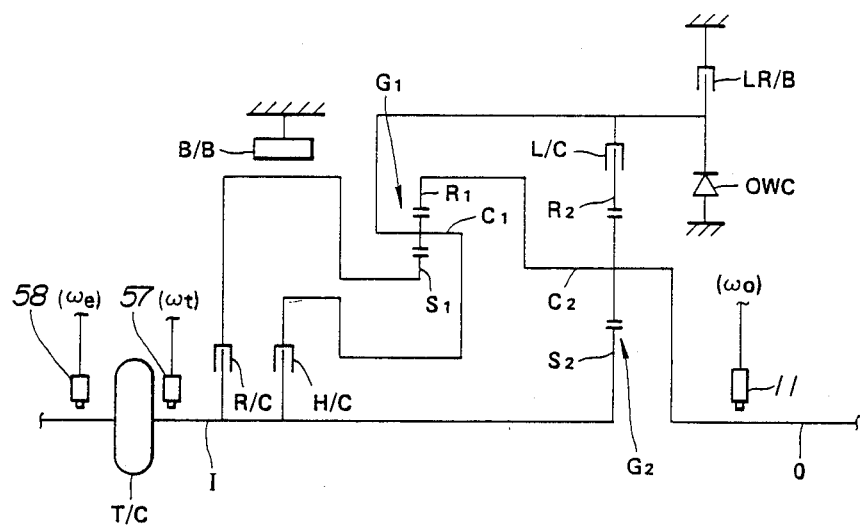
FIG. 16 is a view similar to FIG. 9 showing a power transmission mechanism of a multi-ratio automatic transmission with various sensors used by a third embodiment.
Figure 17:
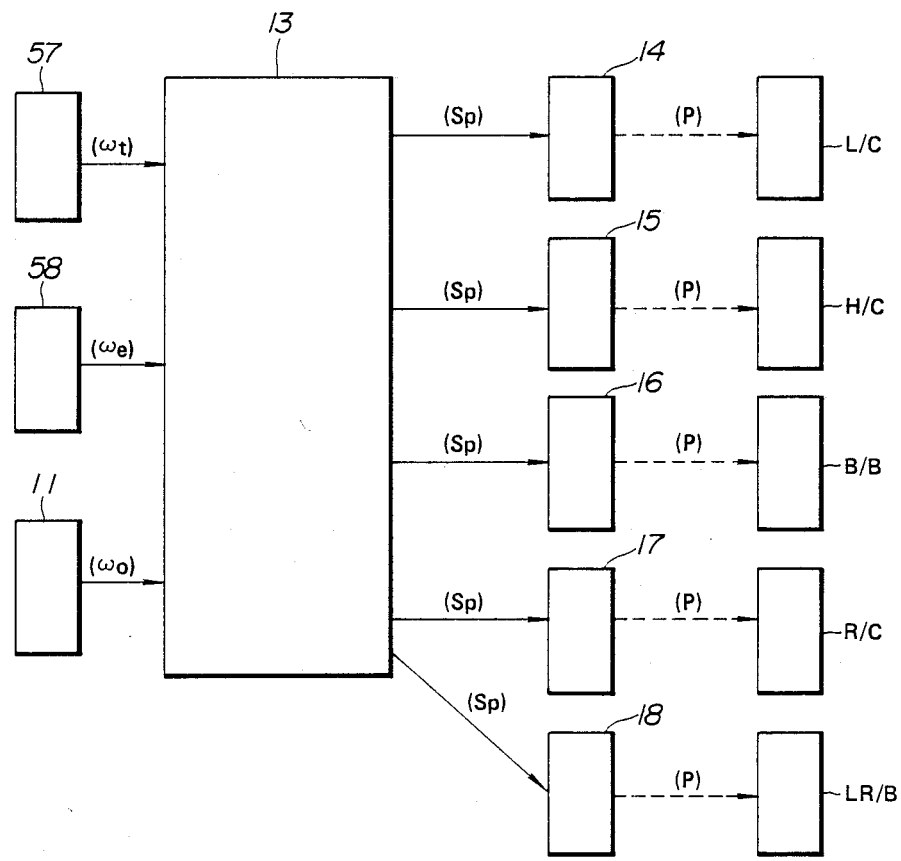
FIG. 17 is a view similar to FIG. 10 showing a control unit of the third embodiment.
Figure 18:
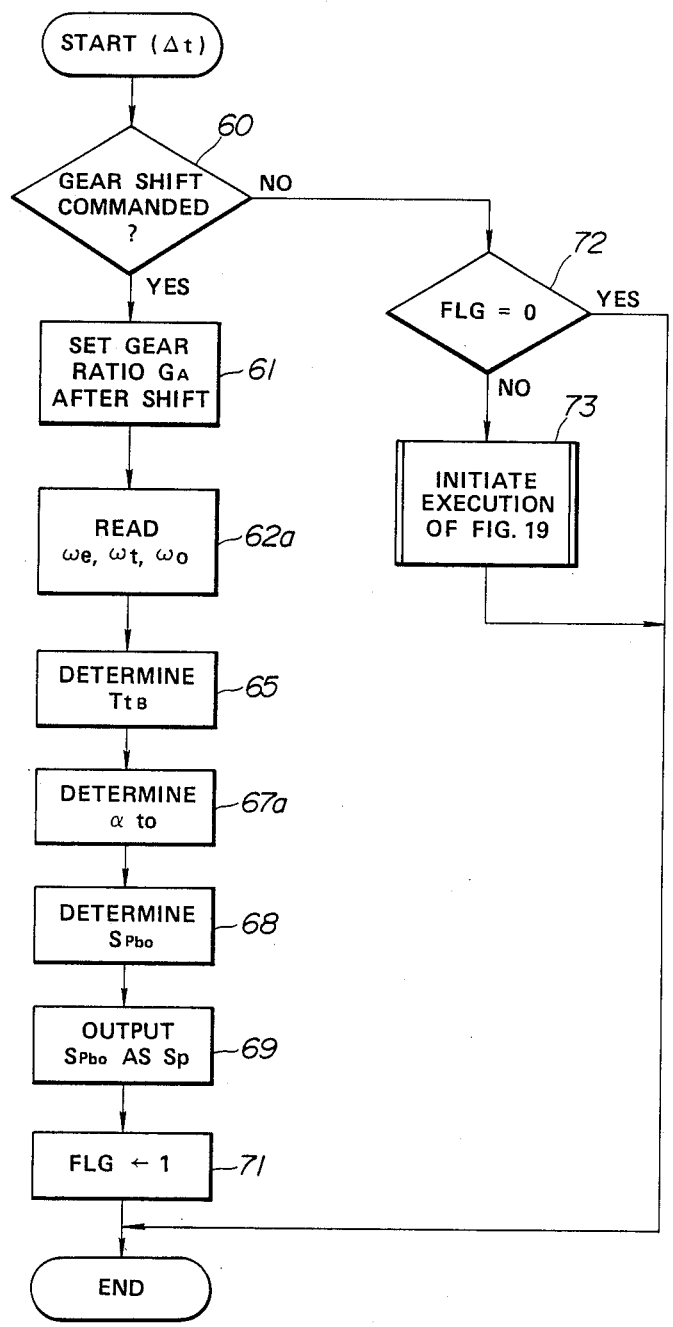
FIG. 18 is a flow chart of a program executed after expiration of a predetermined time ($\Delta t$)
Figure 19:
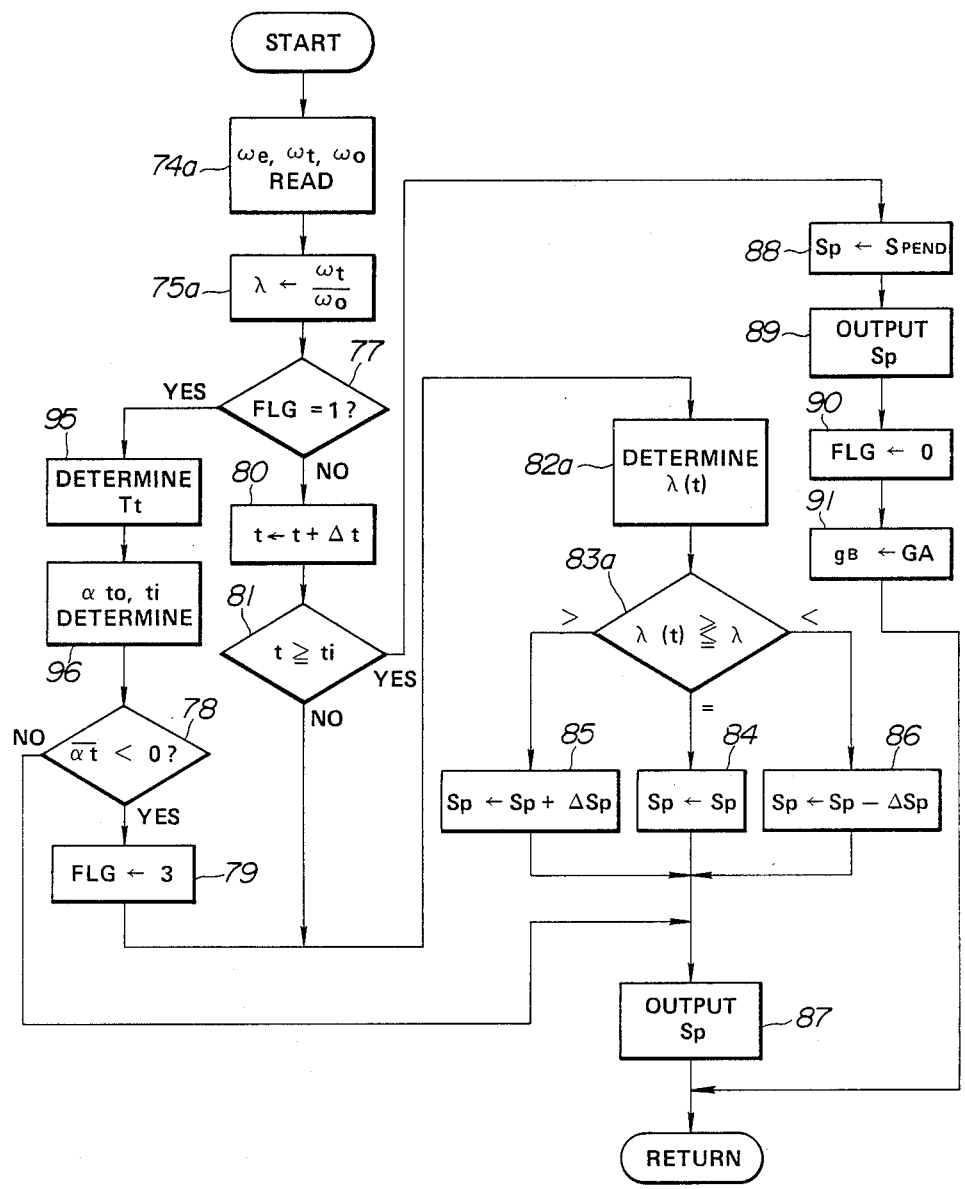
FIG. 19 is a flow chart of a gear change control routine.

Referring to FIGS. 16 to 19, the last embodiment, the control is made to adjust an actual input/output revolution speed ratio $\lambda$ (lambda), i.e., $\lambda=\omega_t/\omega_O$, toward a target value. As shown in FIG. 16, there is provided an output revolution speed sensor 11, an input revolution speed sensor 57, and an engine revolution speed sensor 58. As shown in FIG. 17, the output signals of these sensors 11, 57, and 58 are supplied to a microcomputer based control unit 13 which stores in its ROM control programs as shown in FIGS. 18 and 19.

The programs shown in FIGS. 18 and 19 correspond to the programs shown in FIGS. 11 and 12, respectively. Thus, similar steps are designated by the same reference numerals throughout FIGS. 11, 12, 18, and 19. The corresponding steps even though the contents are different are designated by the same reference numerals with a suffix a.

Referring to FIG. 18, in a step 62a, an output revolution speed $\omega_O$ (omega O) is read in addition to an engine revolution speed $\omega_e$ (omega a) and an input revolution speed $\omega_t$ (omega t), and in a step 67a a target initial input revolution speed rate-of-change $\alpha_{t0}$ (alpha t0) only is determined (see step 67 in FIG. 11). Referring to FIG. 19, in a step 74a, in addition to an input revolution speed $\omega_t$ (omega t), an engine revolution speed $\omega_e$ (omega e) and an output revolution speed $\omega_O$ (omega O) are read. Then, in a step 75a, a present input/output revolution speed ratio $\lambda$ (lambda) is determined ($\lambda=\omega_t/\omega_O$). In new steps 95 and 96 inserted between steps 77 and 78, similarly to the arithmetic operations performed in the step 65 (see FIG. 11), a present input torque $T_t$ is determined and then using this input torque $T_t$ and output revolution speed $\omega_O$ (omega O), a target initial input revolution speed rate-of-change $\alpha_{t0}$ (alpha t0) and an inertia phase period $t_i$ are determined. In a step 82a which is selected during the inertia phase, a target input/output revolution speed ratio $\lambda(t)$ is determined. In the subsequent step 83a, this target input/output revolution speed ratio $\lambda(t)$ is compared with the actual input/output revolution speed ratio $\lambda$ (lambda). In accordance with the result of the comparison step 83a, the program proceeds to a step 84 or 85 or 86.

As will now be understood from the preceding description of the embodiments according to the present invention, since a rate of the proceeding of shifting operation during an inertia phase is adjusted to a target value such that a transmission output torque varies without any rapid change during the inertia phase and agrees smoothly with output torque value to be established after the gear shift at the ending of the inertia phase, a rapid torque change during the inertia phase, which would cause a shift shock, has been eliminated, and a shock which would be caused due to a step-like change of torque at the ending of the inertia phase has been eliminated. Besides, since the timing at which the hydraulic fluid pressure applied to the shifting frictional element rises at the initiation of the inertia phase and the amount of such rise of the hydraulic fluid pressure has been matched to the needs of the actual gear shifting, the possibility of occurrence of a shock at the initiation of the inertia phase has been eliminated.

What is claimed is:

1. A shift shock alleviating system for an automatic transmission having a power transmitting mechanism and a plurality of frictional elements at least one of which is activated during a gear shift which includes a torque phase followed by an inertia phase, the power transmitting mechanism including an input shaft and an output shaft, said shift shock alleviating system comprising:

means for determining an input torque applied to the input shaft and for generating an input torque indicative signal indicative of said input torque;

means for determining an output revolution speed of the output shaft and for generating an output revolution speed indicative signal indicative of said output revolution speed;

means, responsive to said input torque indicative signal and to said output revolution speed indicative signal, for storing said input torque and said output revolution speed at the beginning of the inertia phase, for computing a period of time of the inertia phase based on said stored input torque and on said stored output revolution speed, and for generating a period of time indicative signal indicative of said period of time;

means for determining a rate of variation of a target value during the inertia phase as a function of said period of time indicative signal;

means for varying said target value at said rate during the inertia phase of the gear shift; and means for regulating a hydraulic fluid pressure applied to a shifting frictional element such that an actual value follows said target value.

2. A shift shock alleviating system for an automatic transmission having a power transmitting mechanism and a plurality of frictional elements at least one of which is activated during a gear shift which includes a torque phase followed by an inertia phase, the power transmitting mechanism including an input shaft and an output shaft, said shift shock alleviating system comprising:

means for determining an input torque applied to the input shaft and for generating an input torque indicative signal indicative of said input torque;

means for determining an output revolution speed of the output shaft and for generating an output revolution speed indicative signal indicative of said output revolution speed;

means, responsive to said input torque indicative signal and to said output revolution speed indicative signal, for storing said input torque and said output revolution speed at the beginning of the inertia phase, for computing a period of time of the inertia phase based on said stored input torque and on said stored output revolution speed, and for generating a period of time indicative signal indicative of said period of time;

means for determining a target rate of proceeding the gear shift during the inertia phase of the gear shift as a function of said period of time indicative signal such that a transmission output torque varies without any rapid change and agrees smoothly with an output torque value to be established after the gear shift at the end of the inertia phase; and means for regulating a hydraulic fluid pressure applied to a shifting frictional element such that an actual rate of proceeding the gear shift follows said target rate.

3. A shift shock alleviating system for an automatic transmission having a power transmitting mechanism and a plurality of frictional elements at least one of which is activated during a gear shift which includes a torque phase followed by an inertia phase, the power transmitting mechanism including an input shaft and an output shaft, said shift shock alleviating system comprising:

means for determining an input torque applied to the input shaft and for generating an input torque indicative signal indicative of said input torque;

means for determining an output revolution speed of the output shaft and for generating an output revolution speed indicative signal indicative of said output revolution speed;

means, responsive to said input torque indicative signal and to said output revolution speed indicative signal, for storing said input torque and said output revolution speed at the beginning of the inertia phase, for computing a period of time of the inertia phase based on said stored input torque and on said stored output revolution speed, and for generating a period of time indicative signal indicative of said period of time computed;

means for computing an initial target value as a function of said stored input torque;

means for determining a target rate of proceeding the gear shift during the inertia phase as a function of said period of time indicative signal;

means for determining a target value as a function of said computed initial target value and said target rate; and means for regulating a hydraulic fluid pressure applied to a shifting frictional element such that an actual value indicative of proceeding the gear shift follows said target value.

4. A method of alleviating a shift shock during a gear shift in an automatic transmission having a power transmission mechanism and a plurality of frictional elements at least one of which is activated during the gear shift which includes a torque phase followed by an inertia phase, the power transmission mechanism including an input shaft and an output shaft, the method comprising the steps of:

determining an input torque applied to the input shaft and generating an input torque indicative signal indicative of said input torque;

determining an output revolution speed of the output shaft and generating an output revolution speed indicative signal indicative of said output revolution speed;

storing, responsive to said input torque indicative signal and to said output revolution speed indicative signal, said input torque and said output revolution speed at the beginning of the inertia phase, computing a period of time of the inertia phase based on said stored input torque and on said stored output revolution speed, and generating a period of time indicative signal indicative of said period of time;

computing an initial target value as a function of said stored input torque;

determining a target rate of proceeding the gear shift during the inertia phase as a function of said period of time indicative signal;

determining a target value as a function of said initial target value and said target rate; and regulating a hydraulic fluid pressure applied to a shifting frictional element such that an actual value indicative of proceeding the gear shift follows said target value.

* * * * *